US012764550B2

(12) United States Patent
Bhatia et al.

(10) Patent No.: US 12,764,550 B2
(45) Date of Patent: Oct. 13, 2026

(54) CITIZENS BROADBAND RADIO SERVICE CHANNEL SELECTION FOR CELLULAR COMMUNICATION NETWORKS

(71) Applicant: Dell Products L.P., Round Rock, TX (US)

(72) Inventors: Yogesh Bhatia, San Jose, CA (US); Ravi Sharma, Santa Clara, CA (US); Ramy Atawia, Kanata (CA); Jia Liu, Newmarket (CA)

(73) Assignee: Dell Products L.P., Round Rock, TX (US)

( * ) Notice: Subject to any disclaimer, the term of this patent is extended or adjusted under 35 U.S.C. 154(b) by 594 days.

(21) Appl. No.: 18/175,174

(22) Filed: Feb. 27, 2023

(65) Prior Publication Data

US 2024/0292228 A1 Aug. 29, 2024

(51) Int. Cl.

| | |
|---|---|
| ***H04W 16/14*** | (2009.01) |
| ***H04W 16/10*** | (2009.01) |
| ***H04W 72/0453*** | (2023.01) |
| ***H04W 72/541*** | (2023.01) |
| *H04W 84/04* | (2009.01) |

(52) U.S. Cl.
CPC ........... *H04W 16/14* (2013.01); *H04W 16/10* (2013.01); *H04W 72/0453* (2013.01); *H04W 72/541* (2023.01); *H04W 84/042* (2013.01)

(58) Field of Classification Search
CPC ..................................................... H04W 16/14
See application file for complete search history.

(56) References Cited

U.S. PATENT DOCUMENTS 10,362,574 B2 7/2019 Kannan et al.
11,159,950 B2 10/2021 Cimpu et al.
(Continued)

FOREIGN PATENT DOCUMENTS

CN 109190379 A 1/2019
CN 111989585 A 11/2020
(Continued)

OTHER PUBLICATIONS

International Search Report and Written Opinion received for PCT Application Serial No. PCT/US2023/035966 dated Feb. 9, 2024, 13 pages.
(Continued)

*Primary Examiner* — Jason E Mattis
(74) *Attorney, Agent, or Firm* — Amin, Turocy & Watson, LLP

(57) ABSTRACT

The described technology is generally directed towards citizens' broadband radio service (CBRS) channel selection for cellular communication networks in a manner that reduces the risk of CBRS channel revocation due to incumbent activity within a dynamic protection area. A data store can be maintained that includes dynamic protection area location information as well as historic incumbent CBRS channel use information. When selecting a CBRS channel for a radio access network (RAN) node, the position of the RAN node can be considered to determine if the RAN node is in or near a dynamic protection area. If so, the data store can be consulted to avoid selecting CBRS channels that have historically been subject to revocation in the dynamic protection area.

20 Claims, 9 Drawing Sheets

(56) References Cited

U.S. PATENT DOCUMENTS

| | | | | |
|---|---|---|---|---|
| 2017/0055193 | A1* | 2/2017 | Mueck | H04W 16/14 |
| 2019/0115985 | A1* | 4/2019 | Bechta | H04B 17/318 |
| 2019/0342783 | A1* | 11/2019 | Kim | H04W 24/08 |
| 2019/0364565 | A1 | 11/2019 | Hmimy et al. | |
| 2020/0045615 | A1 | 2/2020 | Karimli et al. | |
| 2020/0059405 | A1 | 2/2020 | Liu et al. | |
| 2020/0162929 | A1* | 5/2020 | Cimpu | H04J 11/0026 |
| 2020/0213862 | A1 | 7/2020 | Sevindik et al. | |
| 2021/0337620 | A1 | 10/2021 | Zhu et al. | |
| 2022/0400502 | A1 | 12/2022 | Maeder et al. | |
| 2022/0417761 | A1 | 12/2022 | Khawer et al. | |
| 2023/0232450 | A1 | 7/2023 | Yang et al. | |
| 2023/0262715 | A1* | 8/2023 | Sevindik | H04W 72/1215 370/329 |
| 2024/0032005 | A1* | 1/2024 | Srivastava | H04W 72/56 |
| 2024/0114352 | A1* | 4/2024 | Bandyopadhyay | H04W 16/14 |
| 2025/0254010 | A1* | 8/2025 | Lin | H04L 5/0073 |

FOREIGN PATENT DOCUMENTS

| | | | |
|---|---|---|---|
| EP | 3 319 358 | A1 | 5/2018 |
| WO | 2016/033049 | A1 | 3/2016 |
| WO | 2022/011206 | A1 | 1/2022 |

OTHER PUBLICATIONS

Etsi Draft Specification "Reconfigurable Radio Systems; Feasibility Study on Existing Spectrum Sharing Frameworks for Temporary and Flexible Spectrum Access", European Telecommunications Standards Institute, vol. 08, Jan. 13, 2023, 47 pages.

Spectrum Sharing Committee "CBRS Incumbent Protections and Encumbrances Overview—Document WINNF-TR-5003, Version V1.0.0" Wireless Innovation Forum, Apr. 28, 2020, 67 pages.

International Search Report and Written Opinion received for PCT Application Serial No. PCT/US2023/035963 dated Apr. 9, 2024, 25 pages.

Qaio et al., "Dynamic Frequency Selection Based on Minimum Interference and Minimum Occupation Time in Licensed-assisted Access", Proceedings of International Conference on Communication Technology, IEEE, 2015, pp. 827-832.

So et al., "Voice/data Transmission in Common Packet Channel of 3GPP", XP-000988630, Department of Electrical Engineering & Computer Science, IEEE, 2000, pp. 1473-1477.

Voicu et al., "Survey of Spectrum Sharing for Inter-Technology Coexistence", arxiv:1712.08589v2, Jun. 4, 2018, 31 pages.

Notification Concerning Transmittal of International Preliminary Report on Patentability received for PCT Application Serial No. PCT/US2023/035963 dated Sep. 4, 2025, 15 pages.

Notification Concerning Transmittal of International Preliminary Report on Patentability received for PCT Application Serial No. PCT/US2023/035966 dated Sep. 11, 2025, 6 pages.

European Office Action mailed Oct. 8, 2025 for European Patent Application No. 23806114.7, 3 pages.

Non-Final Office Action received for U.S. Appl. No. 18/173,908 dated Jan. 15, 2026, 9 pages.

Notice of Allowance received for U.S. Appl. No. 18/173,908 dated Jun. 10, 2026, 8 pages.

* cited by examiner

CITIZENS BROADBAND RADIO SERVICE CHANNEL SELECTION FOR CELLULAR COMMUNICATION NETWORKS

BACKGROUND

The citizens' broadband radio service (CBRS) refers to radio communication frequencies in the 3550 megahertz (MHz) to 3700 MHz range. The United States Federal Communications Commission (FCC) has designated the CBRS frequency range for sharing among different users, including "incumbent" users, "priority access license (PAL)" users and "general authorized access (GAA)" users.

Incumbent users generally include the United States Navy as well as commercial fixed satellite stations. PAL users generally include users that purchase spectrum licenses at a CBRS PALs auction. GAA users are unlicensed users that can use the CBRS frequencies for free, subject to a requirement that GAA users avoid interference with incumbent users and PAL users.

A spectrum access system (SAS) helps users avoid interfering uses of CBRS frequencies. When a user wants to use a CBRS band in a geographic location, the user submits a request to the SAS. If the CBRS band is available in the geographic location, the SAS will grant the request.

Wireless service providers can use CBRS to enhance their networks. To use CBRS, wireless service providers can configure their radio access network (RAN) nodes to request usage of CBRS bands from the SAS. A RAN node can assess the performance of different available CBRS bands and can request use of a most suitable CBRS band. The granted CBRS band can be used by the RAN node until revoked by the SAS.

Certain geographic areas are considered "dynamic protection areas" for the purpose of CBRS. In a dynamic protection area, also referred to herein as a protection area, an incumbent user may occasionally require use of one or more CBRS channels. For example, a navy vessel traveling near a dynamic protection area may use a CBRS channel as it passes, and afterwards the vessel may no longer need the CBRS channel within the dynamic protection area. GAA use of the navy vessel's CBRS channel, within the dynamic protection area, may be revoked while the CBRS channel is in use by the navy vessel. GAA use of the navy vessel's CBRS channel may be restored after the navy vessel departs from the dynamic protection area.

RAN nodes in or near dynamic protection areas therefore experience a unique problem in view of the possible revocation of their granted CBRS channel. A RAN node positioned in or near a dynamic protection area can successfully secure a CBRS channel from the SAS while an incumbent user is inactive, however when the incumbent user returns to an active state, the SAS can revoke the RAN node's authorization to use the CBRS channel. In this scenario, the RAN node can be forced to request another vacant CBRS channel from the SAS. However, the SAS is not necessarily available when needed. The RAN node may be required to wait until a next "coordinated periodic activities among SAS" (CPAS) cycle. CPAS cycles can occur, e.g., once every 24 hours. As a result, the possible downtime for a RAN node, after a CBRS channel revocation, can be as high as 24 hours. This potential downtime presents a meaningful disruption for the RAN node and the network that uses the RAN node.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
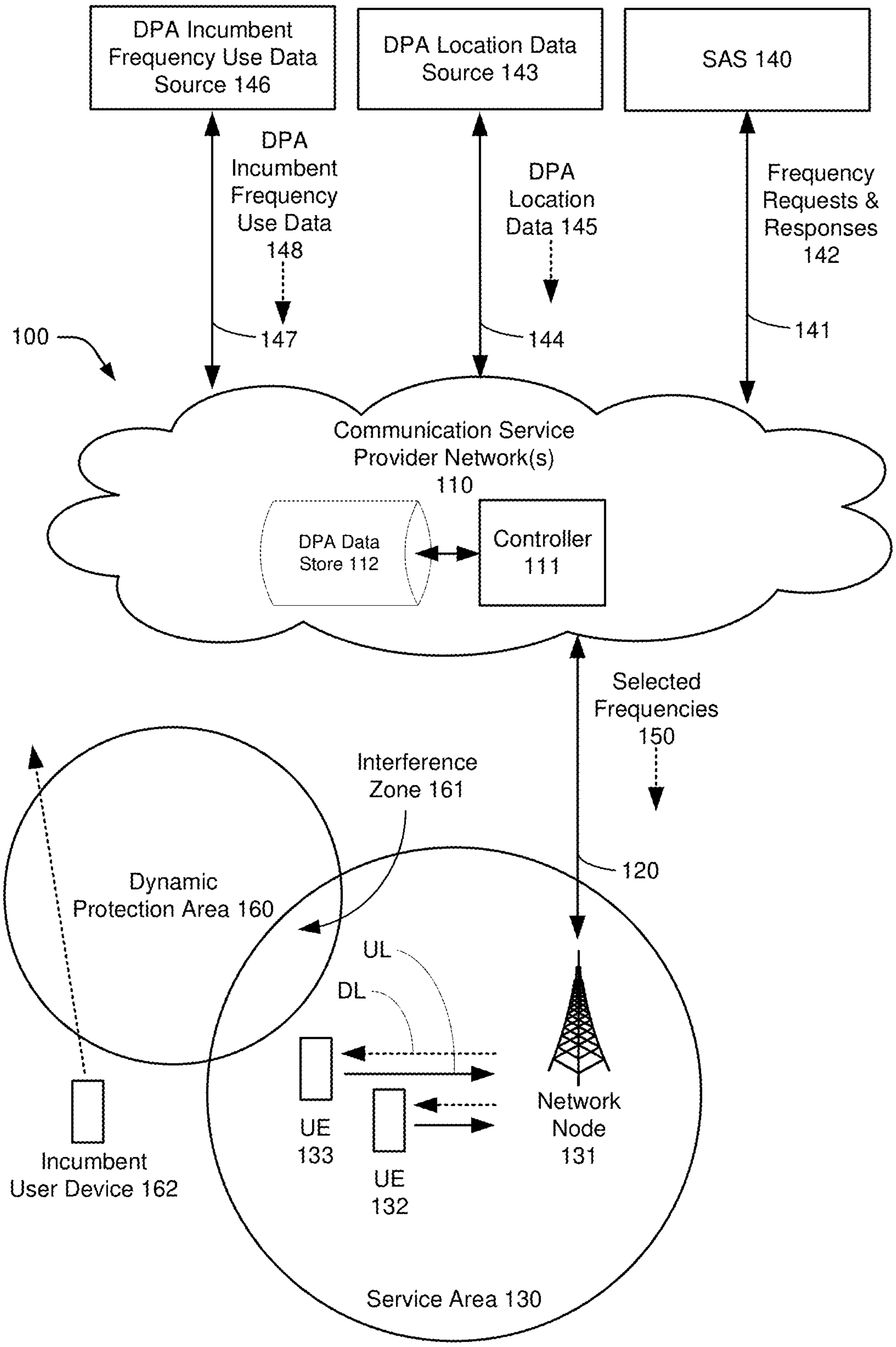
FIG. 1 illustrates an example cellular communication network adapted for CBRS channel selection, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The subject application generally relates to CBRS channel selection for cellular communication networks in a manner that reduces the risk of CBRS channel revocation due to incumbent activity within a dynamic protection area. A data store can be maintained that includes dynamic protection area location information as well as historic incumbent CBRS channel use information. When selecting a CBRS channel for a RAN node, the position of the RAN node can be considered to determine if the RAN node is in or near a dynamic protection area. If so, the data store can be consulted to avoid selecting CBRS channels that have historically been subject to revocation in the dynamic protection area.

FIG. 1 illustrates an example cellular communication network adapted for CBRS channel selection, in accordance with one or more embodiments described herein. FIG. 1 includes a wireless communication system 100 comprising communication service provider network(s) 110, a network node 131 that provides cellular service in a service area 130, and user equipment (UEs) 132, 133. The communication service provider network(s) 110 can include a controller 111 equipped and a dynamic protection area (DPA) data store 112. The communication service provider network(s) 110 can also be adapted to communicate with a spectrum access system (SAS) 140, as well as a DPA location data source 143 and a DPA incumbent frequency use data source 146.

The network node 131 may be adapted to use a CBRS channel selected by the controller 111 and the DPA data store 112. Because the service area 130 overlaps with a dynamic protection area 160, an incumbent user device 162 may occasionally become active within the dynamic protection area 160, in which case the incumbent user device 162 may reclaim use of the CBRS channel, thereby terminating the use of the reclaimable channel by the network node 131. Therefore, the controller 111 can be adapted to select a CBRS channel in a manner that reduces the risk of the selected CBRS channel being reclaimed and revoked. General features of the communication system 100 will be described below, followed by a description of features and operations involved in CBRS channel selection.

In FIG. 1, a backhaul link 120 connects the communication service provider network(s) 110 and the network node 131. The network node 131 can communicate with UEs 132, 133 within its service area 130. The dashed arrow lines from the network node 131 to the UEs 132, 133 represent downlink (DL) communications to the UEs 132, 133. The solid arrow lines from the UEs 132, 133 to the network node 131 represent uplink (UL) communications.

In general, with reference to FIG. 1, the non-limiting term "user equipment" can refer to any type of device that can communicate with network node 131 in a cellular or mobile communication system 100. UEs 132, 133 can have one or more antenna panels having vertical and horizontal elements. Examples of UEs 132, 133 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 132, 133 can also comprise IOT devices that communicate wirelessly.

In various embodiments, system 100 comprises communication service provider network(s) 110 serviced by one or more wireless communication network providers. Communication service provider network(s) 110 can comprise a "core network". In example embodiments, UEs 132, 133 can be communicatively coupled to the communication service provider network(s) 110 via a network node 131. The communication service provider network(s) 110, e.g., the controller 111, can provide settings, parameters, and other control information to the network node 131, which can configure the network node 131 communications with the UEs 132, 133. In some embodiments, the controller 111 can comprise a RAN intelligent controller (RIC), which can be adapted to perform the functions described herein.

The network node 131 can communicate with UEs 132, 133, thus providing connectivity between the UEs 132, 133 and the wider cellular network. The UEs 132, 133 can send transmission type recommendation data to the network node 131. The transmission type recommendation data can comprise a recommendation to transmit data via a closed loop multiple input multiple output (MIMO) mode and/or a rank-1 precoder mode.

Network node 131 can have a cabinet and other protected enclosures, computing devices, an antenna mast, and multiple antennas for performing various transmission operations (e.g., MIMO operations) and for directing/steering signal beams. Network node 131 can comprise one or more base station devices which implement features of the network node. Network nodes can serve several cells, depending on the configuration and type of antenna. In example embodiments, UEs 132, 133 can send and/or receive communication data via wireless links to the network node 131.

Communication service provider networks 110 can facilitate providing wireless communication services to UEs 132, 133 via the network node 131 and/or various additional network devices (not shown) included in the one or more communication service provider networks 110. The one or more communication service provider networks 110 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 110 can be or comprise the wireless communication network and/or various additional devices and components of the wireless communication network (e.g., additional network devices and cell, additional UEs, network server devices, etc.).

The network node 131 can be connected to the one or more communication service provider networks 110 via one or more backhaul links 120. The one or more backhaul links 120 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 120 can also comprise wireless link components, such as but not limited to, line-of-sight (LOS) or non-LOS links which can comprise terrestrial air-interfaces or deep space links (e.g., satellite communication links for navigation). Backhaul links 120 can be implemented via a "transport network" in some embodiments. In another embodiment, network node 131 can be part of an integrated access and backhaul network. This may allow easier deployment of a dense network of self-backhauled 5G cells in a more integrated manner by building upon many of the control and data channels/procedures defined for providing access to UEs 132, 133.

Wireless communication system 100 can employ various cellular systems, technologies, and modulation modes to facilitate wireless radio communications between devices (e.g., the UEs 132, 133 and the network node 131). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 132, 133 and the network node 131) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

In an example of CBRS channel selection according to this disclosure, the DPA data store 112 can be maintained for use in selecting CBRS channels for network nodes such as 131. The DPA data store 112 can generally comprise locations of dynamic protection areas such as 160, e.g., locations of dynamic protection areas within the United States and/or other regions. Dynamic protection area locations can be updated periodically according to a first update interval, e.g., weekly or monthly, by connecting to the DPA location data source 143 via a first connection 144, retrieving DPA location data 145, and storing the DPA location data 145 in the DPA data store 112.

The DPA data store 112 can further comprise DPA incumbent frequency use data 148. DPA incumbent frequency use data 148 can be updated periodically according to a second update interval, e.g., daily or weekly, by connecting to the DPA incumbent frequency use data source 146 via a second connection 147, retrieving DPA incumbent frequency use data 148, and storing the DPA incumbent frequency use data 148 in the DPA data store 112. The DPA incumbent frequency use data 148 can include, for example, frequency usage information corresponding to each DPA location in the DPA data store 112. The frequency usage information can specify which CBRS channels were used by incumbent users, the duration of the incumbent use, historic dates and times of the incumbent use, and other CBRS channel usage information described herein. Alternatively or additionally, the frequency usage information can specify which CBRS channels were used by other users such as PAL users and GAA users, duration of use of such CBRS channels, and whether usage of such CBRS channels were revoked. This information can also be used to determine reclaimable CBRS channels, for example, a history of CBRS channel use that was not revoked can indicate that a CBRS channel appears to not be reclaimable, while the absence of such history can be inferred to indicate a reclaimable CBRS channel.

In order to select a CBRS channel for use by a network node 131, the controller 111 can be configured to use the DPA data store 112 to avoid selecting "reclaimable" CBRS channels. Reclaimable CBRS channels are CBRS channels that are at risk of being revoked due to activity of the incumbent user device 162. The controller 111 can compare the location of the network node 131 with locations of dynamic protection areas stored in the DPA data store 112. If a dynamic protection area such as DPA 160 is threshold proximate to the network node 131, then the controller 111 can be configured to use network node 131 transmission data such as transmission power, antenna height, and antenna direction to determine whether transmissions of the network node 131 are threshold likely to interfere with incumbent user device 162 transmissions, e.g., whether there is an interference zone 161. The presence of an interference zone 161 can eventually trigger a revocation of network node 131 use of a CBRS channel, e.g., if the incumbent user device 162 becomes active and needs to use the CBRS channel within the dynamic protection area 160.

In response to a determination that CBRS transmissions of the network node 131 could interfere with incumbent user device 162 transmissions, the controller 111 can use the DPA data store 112 to determine which of the multiple different CBRS channels have historically been used by incumbent users, such as the incumbent user device 162. The DPA incumbent frequency use data 148 in the DPA data store 112 may reveal patterns of historic use, wherein certain "reclaimable" CBRS channels are typically used by incumbents within the dynamic protection area 160, while other CBRS channels are not typically used by incumbents within the dynamic protection area 160. The controller 111 can be configured identify reclaimable CBRS channels and avoid selecting a reclaimable CBRS channel for use by the network node 131. Instead, the controller 111 can be configured to select a different CBRS channel for use by the network node 131, wherein the selected different CBRS channel presents a lower risk of being reclaimed from the network node 131.

The controller 111 can be configured to communicate with the SAS 140 via a communication connection 141, for example by sending and receiving frequency requests and responses 142 over the communication connection 141. The controller 111 can request available CBRS channels from the SAS 140, in order to identify a group of available CBRS channels that are available for use by the network node 131. The controller 111 can be configured to eliminate reclaimable CBRS channels from the group of available CBRS channels identified by the SAS 140. The controller 111 can furthermore be configured to select a remaining CBRS channel, e.g., by optionally prioritizing remaining CBRS channels according to channel quality or other criteria. Finally, having identified one or more available and not reclaimable CBRS channels for use by the network node 131, the controller 111 can be configured to send the selected CBRS channel(s) to the network node 131 as selected frequencies 150. The controller 111 can also include network node 131 transmission power parameters, transmission direction parameters, or other parameters for the network node's 131 use of the selected frequencies 150. The network node 131 can be configured to begin transmissions using the selected CBRS channels and other parameters included in the selected frequencies 150.

The network node 131 is one example of a citizenship broadband system device (CBSD), and the techniques disclosed herein can also be applied in the context of other CBSD devices. In summary, a problem addressed by this disclosure arises when a CBSD is installed inside or near a dynamic protection area. Any available CBRS channel can be selected for use by the CBSD. However, when the CBSD or the communication service provider network(s) 110 proceed with CBRS channel selection without considering the CBSD location (latitude, longitude), and whether such CBSD location is close to or within a DPA, a selected CBRS channel comes with a risk of eventually be revoked.

For example, the CBSD may successfully secure a reclaimable channel from SAS 140, wherein the reclaimable channel presents a threshold probability of being reclaimed for incumbent use. When the incumbent user device 162 becomes active, the SAS 140 will revoke that channel from that CBSD. As a result, the CBSD is forced to look for another vacant CBRS channel. Meanwhile, the SAS 140 may not be able to grant another channel to any CBSD until the next CPAS cycle. CPAS is an activity which is done periodically, e.g., once every 24 hours. Therefore, the possible downtime for a CBSD can be as high as 24 hours.

In order to reduce the likelihood of the above described problem, techniques according to this disclosure can predict DPA activity based on geolocation information and can avoid selecting reclaimable CBRS channels with potential interference. As a result, network service disruptions of up to 24 hours due to grant/channel suspensions or revocations in favor or incumbent operations can be avoided.

In an example, techniques according to this disclosure can implement the DPA data store 112 as a DPA specific database which can comprise geo coordinates of shipborne radar, ground stations, and PAL users. Before selecting a CBRS channel, a domain proxy (see FIG. 2) can run an intelligent selection process to determine a distance between a network node 131 and a DPA 160, as well as reclaimable frequencies associated with the DPA 160, and received signal strength indicator (RSSI) based measurements associated with the network node 131, in order to select an appropriate CBRS channel. One example source for DPA information is publicly available wireless innovation forum (WINNF) technical report data.

Some embodiments can detect whether a CBSD such as the network node 131 is located within a DPA 160 or within a threshold proximity to a DPA 160. To avoid interference between network node 131 transmissions and incumbent user device 162 transmissions within the DPA 160, the controller 111 can be configured to choose a CBRS channel that is predicted to experience a reduced likelihood of incumbent use in comparison to other CBRS channels. Additionally, the controller 111 can optionally be configured to choose a CBRS channel that is predicted to present reduced or minimal interference with incumbent user device 162 transmissions.

In response to detecting that a CBSD such as network node 131 is installed near/inside a DPA 160 service region, an example CBRS channel selection process at the controller 111 can learn information about CBRS channel use within the DPA 160 service region, including allocated frequencies, time each frequency was allocated, time each frequency was revoked, and location information. The CBRS channel selection process at the controller 111 can keep track of grant operations which occurred in the past, and the CBRS channel selection process can be adapted to learn from the captured historical data so that in the future, the CBRS channel selection process can predict when an incumbent operation is or will be active. Furthermore, when a CBSD such as network node 131 is installed in or near the DPA 160, the CBRS channel selection process at the controller 111 can avoid selecting reclaimable frequencies for use by the CBSD, unless no other unreserved frequencies are available.

Figure 2:
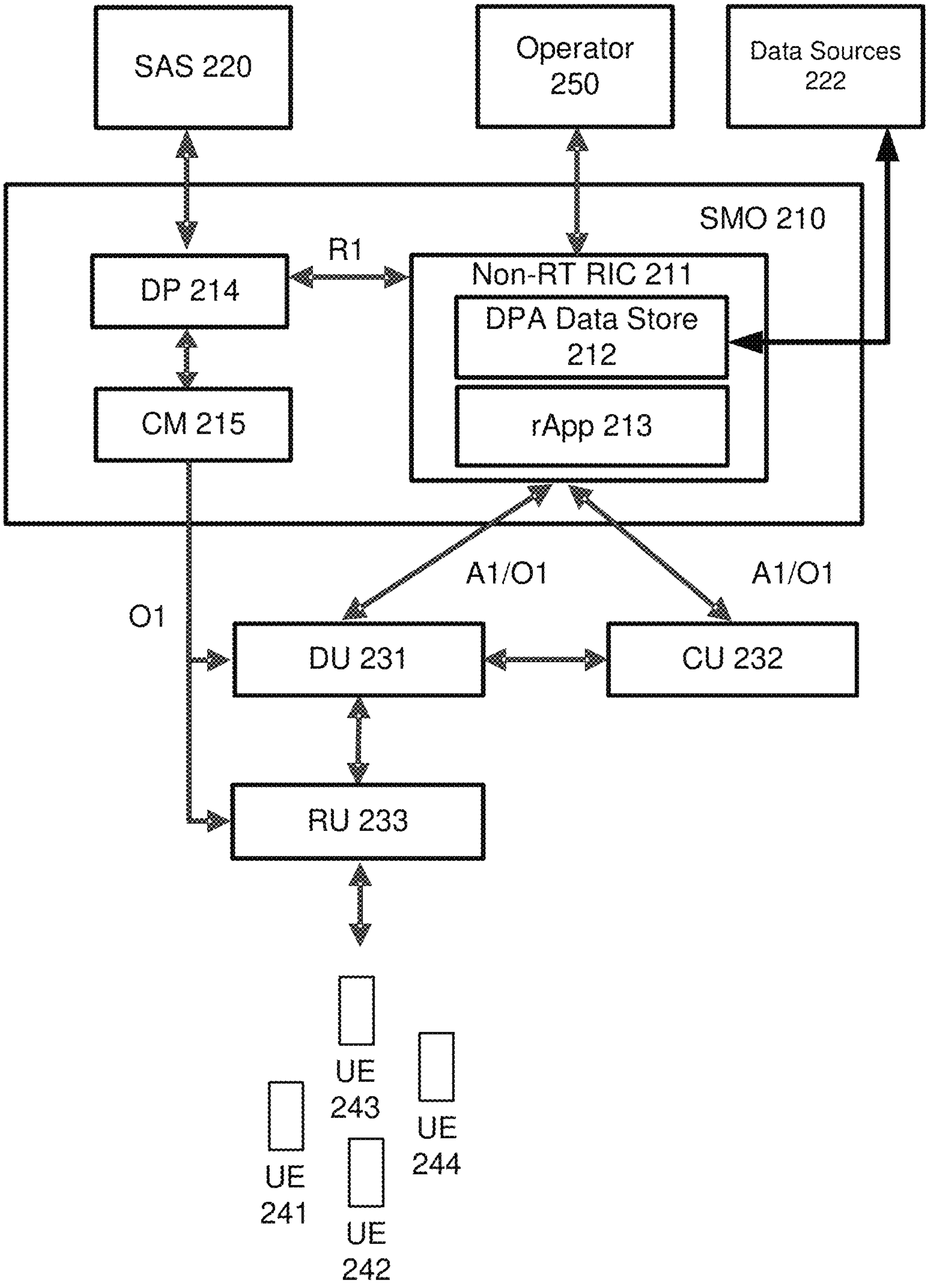
FIG. 2 illustrates an example system architecture of a cellular communication network adapted for CBRS channel selection, in accordance with one or more embodiments described herein.

FIG. 2 illustrates an example system architecture of a cellular communication network adapted for CBRS channel selection, in accordance with one or more embodiments described herein. FIG. 2 includes a SMO 210, a SAS 220, an operator 250, data sources 222, a distributed unit (DU) 231, a central unit (CU) 232, a radio unit (RU) 233, and UEs 241, 241, 243, and 244. The SMO 210 comprises a non-real time RIC (non-RT RIC) 211 which includes an example DPA data store 212 and an rApp 213. The SMO 210 further comprises a domain proxy (DP) 214 and a configuration management module (CM) 215. The non-RT RIC 211 is coupled with the DU 231 and the CU 232 via an A1/O1 interface, and the non-RT RIC 211 is coupled with the DP 214 via an R1 interface. The CM 215 is coupled with the DU 231 and the RU 233 via an O1 interface.

The architecture illustrated in FIG. 2 can implement the cellular communication system 100 introduced in FIG. 1, in some embodiments. The SMO 210 can implement a portion of the communication service provider network(s) 110 of FIG. 1, the DU 231, CU 232, and RU 233 can implement the network node 131 of FIG. 1, the SAS 220 can implement the SAS 140 of FIG. 1, and the UEs 241-244 can implement the UEs 132, 133 of FIG. 1.

In an example embodiment, the architecture illustrated in FIG. 2 can comprise an O-RAN compliant architecture. The SMO 210 can host the non-RT RIC 211 and the DP 214. The non-RT RIC 211 can host the DPA data store 212 and the rApp 213. The DPA data store 212 can be populated from data sources 222, which can implement the DPA location data source 143 and the DPA incumbent frequency use data source 146 illustrated in FIG. 1. In some embodiments, the DPA data store 212 can be populated at least in part from link data sources provided in, e.g., the WINNF specifications, as well as from FCC frequency use data. The DPA data store 212 can be repeatedly updated, e.g., can be updated in response to the FCC receiving new information about incumbent use or other CBRS use. The rAPP 213 can be configured to use the DPA data store 212 to make CBRS channel recommendations for a RAN component such as the RU 233, wherein the CBRS channel recommendations can flag/avoid any reclaimable CBRS channels.

The DP 214 can be adapted to receive channel recommendations from the non-RT RIC 211 via a proprietary interface, or via an O-RAN R1 interface as illustrated in FIG. 2. The DP 214 can also be adapted to receive available channels and grants from the SAS 220. The DP 214 can be adapted to use the CBRS channel recommendations from the non-RT RIC 211 and the available CBRS channels from the SAS 220, along with any channel prioritization logic, to determine selected channels for the RU 233. The DP 214 can be configured to forward selected CBRS channels to the CM 215.

The RU 233 can be configured to act as a CBSD which performs channel measurements that can be used to further prioritize channels received from the SMO 210. In some embodiments, the RU 233 can apply a DP 214 CBRS channel selection communicated over the O1 interface through the CM 215. The RU 233 can be configured to provide wireless service to UEs 241-244 using a CBRS channel according to the CBRS channel selection, wherein the wireless service to the UEs 241-244 can comprise different applications such as URLLC and eMBB.

Figure 3:
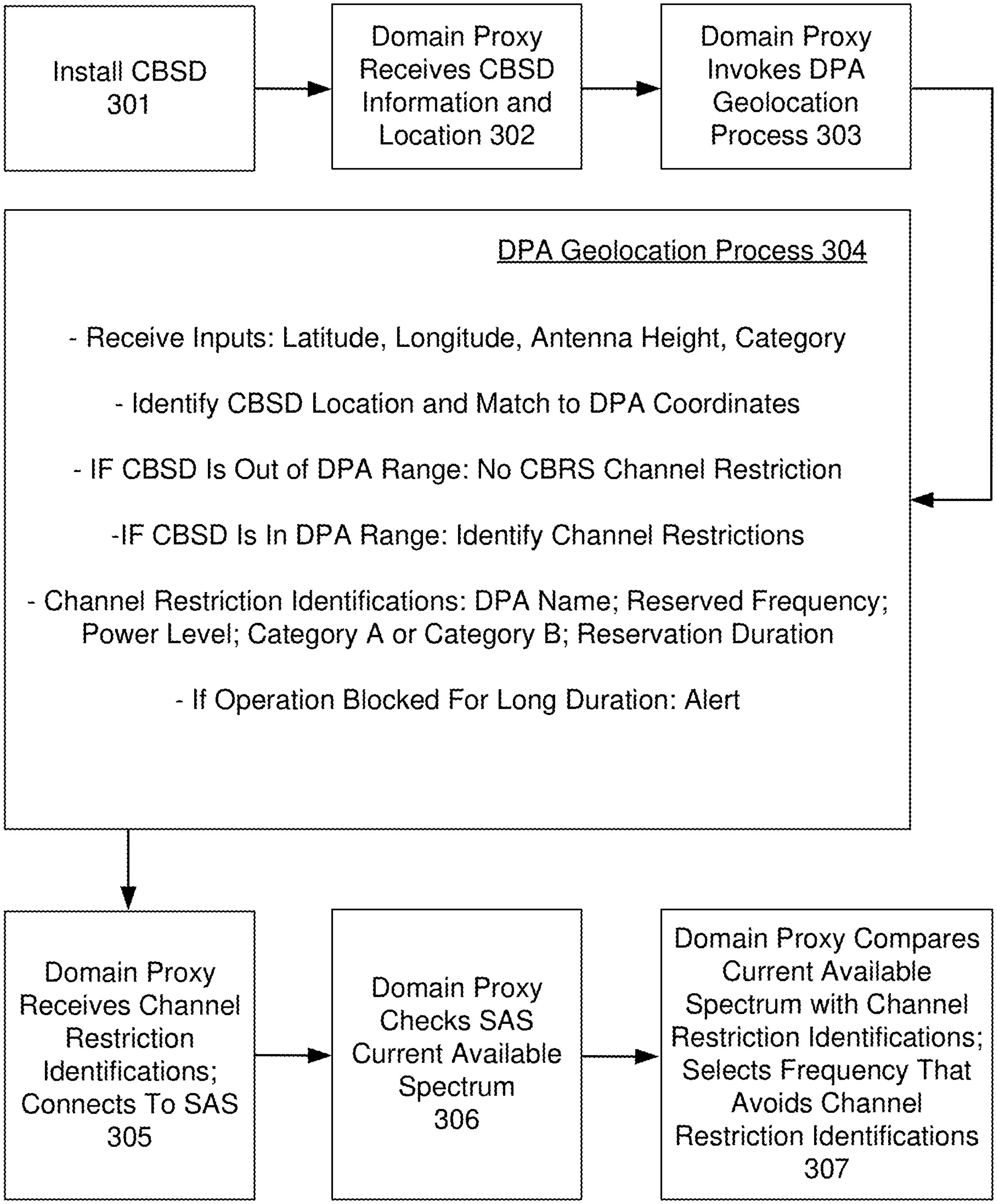
FIG. 3 illustrates example operations of a cellular communication network adapted for CBRS channel selection, in accordance with one or more embodiments described herein.

FIG. 3 illustrates example operations of a cellular communication network adapted for CBRS channel selection, in accordance with one or more embodiments described herein. In embodiments according to FIG. 3, a combination of operations performed by a domain proxy, such as the DP 214 illustrated in FIG. 2, and operations of a DPA geolocation process 304, such as may be implemented at the rApp 213 illustrated in FIG. 2, results in CBRS channel selection for a CBSD such as the RU 233 illustrated in FIG. 2.

At 301, a CBSD is installed, e.g., by installing the RU 233 in a RAN. At 302, in response to the CBSD installation, the domain proxy receives CBSD information and location information. At 303, the domain proxy invokes the DPA geolocation process, e.g., the rApp 213.

At 304, the DPA geolocation process performs multiple operations in order to determine channel restrictions, i.e., reclaimable CBRS channels that are preferably avoided by the CBSD. The operations can optionally include receiving inputs such as latitude, longitude, antenna height, and transmission category of the CBSD. The operations can furthermore optionally include identifying CBSD location and matching/comparing the CBSD location to DPA location coordinates. The operations can furthermore optionally include determining no channel restriction is necessary if the CBSD is out of DPA range, i.e., the CBSD is not at risk of interfering with incumbent transmissions within a DPA. The operations can furthermore optionally include identifying channel restrictions if the CBSD is within range of a DPA, i.e., the CBSD is at risk of interfering with incumbent transmissions within a DPA. The operations can furthermore optionally include outputting channel restriction identifications which can include DPA name, reserved/reclaimable frequencies associated with the DPA, power levels to avoid interference with the DPA, DPA transmission categories such as category A or category B, and reservation duration information (e.g., whether a reservation is a 24 hour reservation or a partial reservation) of reserved/reclaimable frequencies associated with the DPA. The operations can furthermore optionally include generating an alert if an operation such as frequency selection is blocked for a long duration, e.g., 24 hours or more.

At 305, the domain proxy receives the channel restriction identifications output from the DPA geolocation process 304. The domain proxy can connect to the SAS 220. At 306, the domain proxy checks the current available spectrum (CBRS channels) indicated by the SAS 220 to be available for use by the CBSD. At 307, the domain proxy compares the current available spectrum (CBRS channels indicated to be available by the SAS 220) with the channel restriction identifications output by the DPA geolocation process 304. The domain proxy can then select an available CBRS frequency that avoids the channels identified by the channel restriction identifications. The domain proxy can optionally prioritize CBRS channels if multiple CBRS channels are selectable. The domain proxy can notify the CBSD of the CBRS channel selection via a CM 215 as illustrated in FIG. 2.

Figure 4:
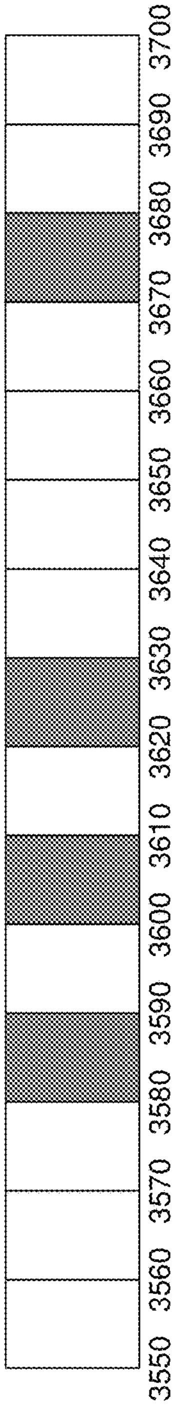
FIG. 4 illustrates a first example group of CBRS channels which excludes unavailable CBRS channels identified via communication with a SAS, in accordance with one or more embodiments described herein.

FIG. 4 illustrates a first example group of CBRS channels which excludes unavailable CBRS channels identified via communication with a SAS, in accordance with one or more embodiments described herein. In FIG. 4, CBRS channels such as 3580-3590 MHz, 3600-3610 MHz, 3620-3630 MHz, and 3670-3680 MHz have been indicated to be unavailable for use by a network node 131, e.g., as indicated by a SAS 140 as described herein. The unavailable CBRS channels are illustrated as gray/black. The unavailable CBRS channels are not available for use by a network node 131, while the remaining CBRS channels are available. The channels indicated to be unavailable CBRS channels in FIG. 4 are examples only, and different CBRS channels can be found to be available/unavailable for different network nodes, depending on data returned from the SAS 140.

Figure 5:
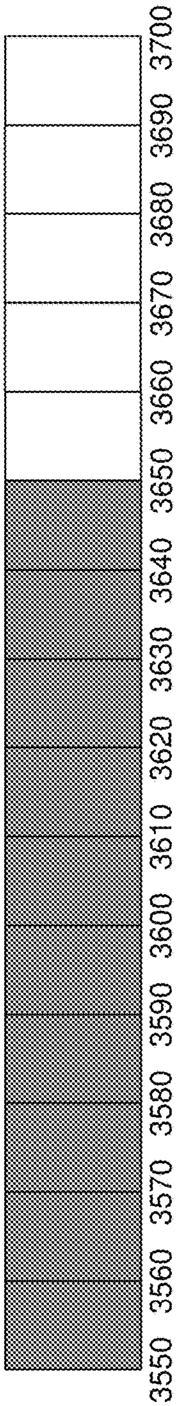
FIG. 5 illustrates a second example group of CBRS channels which excludes reclaimable CBRS channels, in accordance with one or more embodiments described herein.

FIG. 5 illustrates a second example group of CBRS channels which excludes reclaimable CBRS channels, in accordance with one or more embodiments described herein. In FIG. 5, example CBRS channels between 3550 MHz and 3650 MHz have been determined to be reclaimable, e.g., by operation of a controller 111 and DPA data store 112 as described herein. The reclaimable CBRS channels are illustrated as gray/black. The reclaimable CBRS channels are to be avoided when selecting a CBRS channel for use by a network node 131, while the remaining CBRS channels are not considered reclaimable and need not be avoided. The channels indicated to be reclaimable CBRS channels in FIG. 5 are examples only, and different CBRS channels can be found to be reclaimable for different network nodes, depending on the data in the DPA data store 112.

Figure 6:
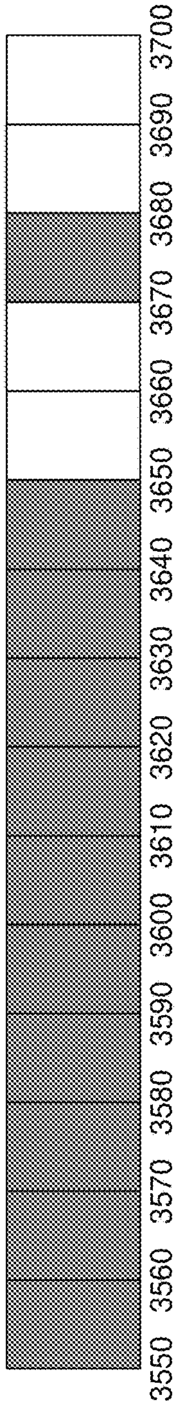
FIG. 6 illustrates a third example group of CBRS channels which excludes both the unavailable CBRS channels of FIG. 4 and the reclaimable CBRS channels of FIG. 5, in accordance with one or more embodiments described herein.

FIG. 6 illustrates a third example group of CBRS channels which excludes both the reclaimable CBRS channels of FIG. 5 and the unavailable CBRS channels of FIG. 4, in accordance with one or more embodiments described herein. The remaining CBRS channels illustrated in FIG. 6 are both available, as indicated by the SAS 140, and subject to reduced risk of being reclaimed by an incumbent user, as determined by application of the DPA data store 112. Embodiments of this disclosure can select any remaining CBRS channels such as those illustrated in FIG. 6, e.g., 3650-3660 MHz, 3660-3670 MHz, 3680-3690 MHz, or 3690-3700 MHz, for use by a network node 131.

Figure 7:
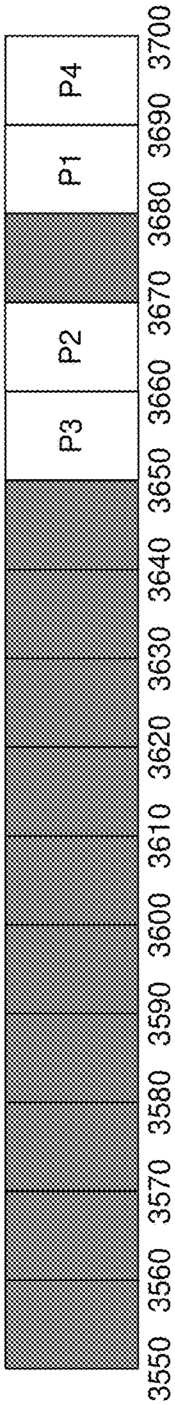
FIG. 7 illustrates the third example group of CBRS channels from FIG. 6, wherein the remaining CBRS channels are prioritized, in accordance with one or more embodiments described herein.

FIG. 7 illustrates the third example group of CBRS channels from FIG. 6, wherein the remaining CBRS channels are prioritized, in accordance with one or more embodiments described herein. As an optional additional step, a group of remaining, non-reclaimable CBRS channels such as illustrated in FIG. 6 can be prioritized according to channel quality or other performance measurements. An example result of such prioritization can be, e.g., a priority 1 (P1) channel, a priority 2 (P2) channel, a priority 3 (P3) channel, and a priority 4 (P4) channel. The higher priority channels, e.g., P1, can be preferentially selected over the lower priority channels.

Figure 8:
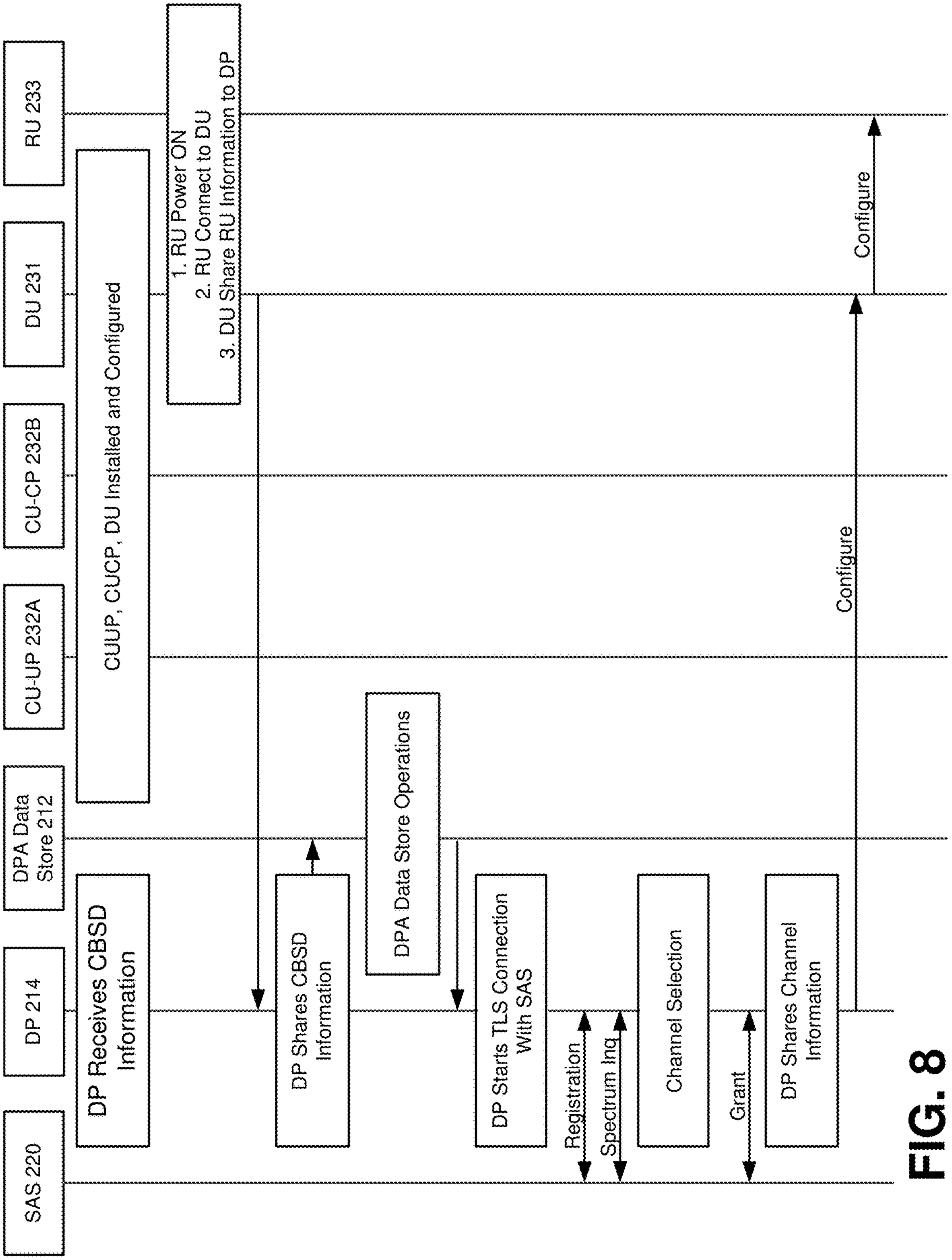
FIG. 8 is a signaling diagram illustrating example interactions between the components illustrated in FIG. 2, in accordance with one or more embodiments described herein.

FIG. 8 is a signaling diagram illustrating example interactions between the components illustrated in FIG. 2, in accordance with one or more embodiments described herein. FIG. 8 includes the components previously introduced in FIG. 2, namely the SAS 220, the DP 214, the DPA data store 212, components of the CU 232 including the CU user plane (CU-UP) 232A and the CU control plane (CU-CP) 232B, the DU 231, and the RU 233.

As illustrated in FIG. 8, initially, the DP 214 can receive CBSD information, e.g., from a network operator. In some embodiments, the CBSD information can be received via a graphical user interface (GUI) provided by the DP 214. The CBSD information can comprise, e.g., information pertaining to a new RU 233, such as serial number, call sign, transmission type/category information, and location information. The CU-UP 232A, the CU-CP 232B, and the DU 231 (the disaggregated RAN components associated with the RU 233) can be installed and configured. The RU 233 can power on, connect to the DU 231, and the DU 231 can share RU 233 information with the DP 214.

Upon receiving RU 233 information from the DU 231, the DP 214 can be configured to share RU 233 information such as the RU 233 location and RU 233 transmission type/category with the DPA data store 212.

The DPA data store 212 can be configured to perform DPA data store operations in order to determine whether any reclaimable CBRS channels exist which should be avoided by the RU 233. The DPA data store operations can comprise, e.g., comparing/matching RU 233 location to location(s) of DPAs in the DPA data store 212. If location coordinates of the RU 233 do not match or are out of range of DPAs in the DPA data store 212, then the DPA data store 212 can conclude/determine/return that no reclaimable CBRS channels exist which should be avoided by the RU 233. Conversely, if location coordinates of the RU 233 do match or are within of range of a DPA in the DPA data store 212, then the DPA data store 212 can initially check if transmissions/operations within the matching DPA are restricted for a long time period such as 24 hours, or if there is a partial (less than 24 hour) restriction. If there is a long restriction, then the DPA data store 212 can return a warning that operation within the DPA is not allowed and a recommendation that the RU 233 be moved to another location. If there is a partial restriction, then the DPA data store 212 can identify reserved/reclaimable frequencies associated with the DPA, along with any additional parameters such as transmission power level parameters and distance parameters specifying distance between the RU 233 and the DPA. The DPA data store 212 can be configured to report to the DP 214, identifying any reclaimable CBRS channels which should be avoided by the RU 233.

In response to the report from the DPA data store 212, the DP 214 can be configured to start a connection such as a transport layer security (TLS) connection with the SAS 220. The DP 214 can register the RU 233 with the SAS 220 and can perform a spectrum inquiry for the RU 233, in order to determine available CBRS channels which are available for use by the RU 233. The DP 214 can perform a channel selection operation to select a CBRS channel for use by the RU 233, wherein the selected CBRS channel is from among available channels identified by the SAS 220, and wherein selection also avoids any reclaimable CBRS channels identified by the DPA data store 212. When multiple CBRS channels are available, the DP 214 can prioritize the available CBRS channels in order to perform the channel selection. The DP 214 can then engage in a grant communication with the SAS 220 in order to confirm a SAS 220 grant of the selected CBRS channel for use by the RU 233. After grant, the DP 214 can share channel information with the DU 231. The shared channel information can identify the granted channel in order to configure the DU 231 and to correspondingly configure the RU 233 to use the granted channel.

Figure 9:
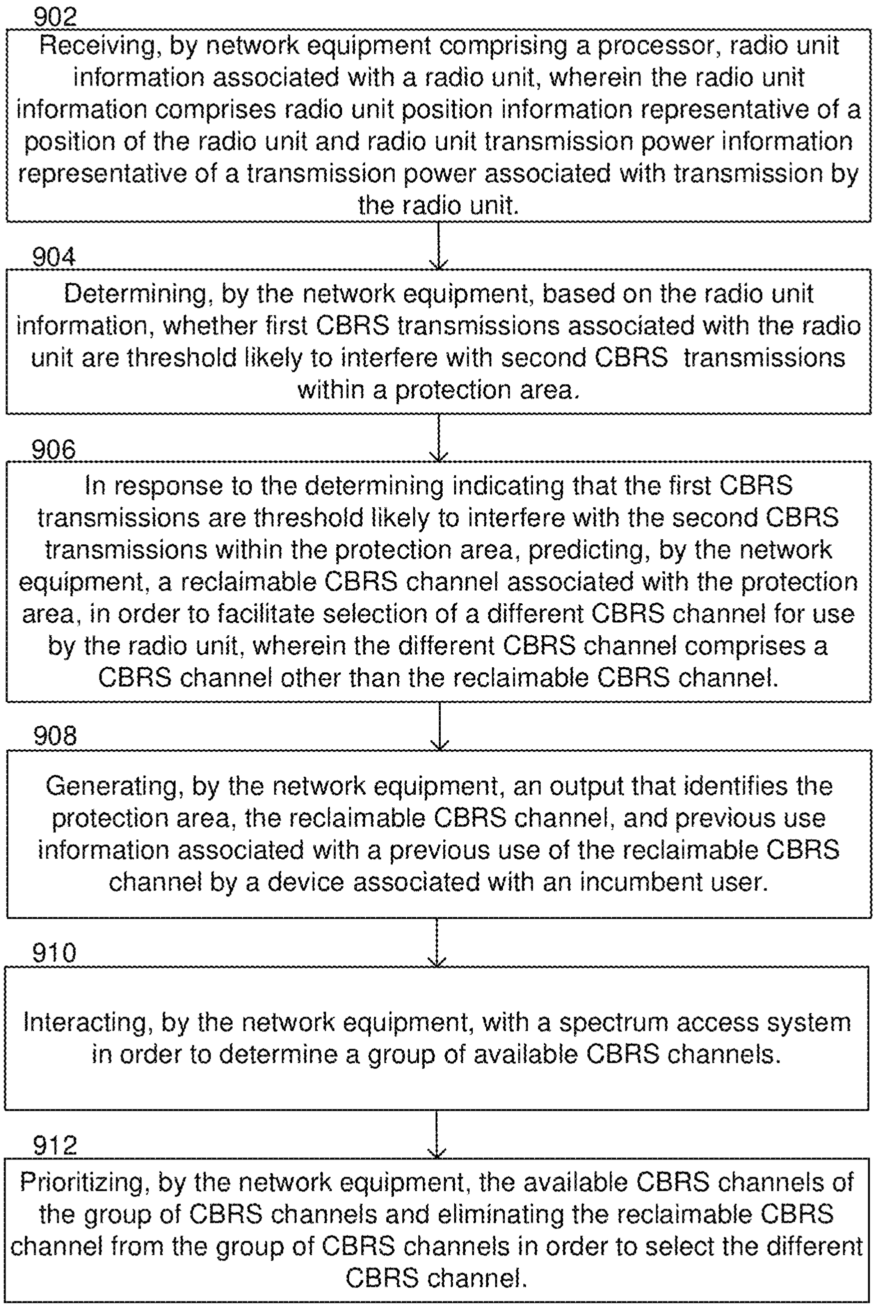
FIG. 9 is a flow diagram of an example, non-limiting computer implemented method to select a CBRS channel for use by a radio unit, in accordance with one or more embodiments described herein.

FIG. 9 is a flow diagram of an example, non-limiting computer implemented method to select a CBRS channel for use by a radio unit, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 9 can be performed by equipment such as the controller 111 and DPA data store 112 illustrated in FIG. 1. Operation 902 comprises receiving, by network equipment 111 comprising a processor, radio unit information associated with a radio unit such as the network node 131, wherein the radio unit information comprises radio unit 131 position information representative of a position of the radio unit 131 and radio unit transmission power information representative of a transmission power associated with transmission by the radio unit 131. In some embodiments, receiving the radio unit information can comprise receiving the radio unit information via a domain proxy 214 such as illustrated in FIG. 2, wherein the DP 214 can be configured to communicate with the radio unit 131.

Operation 904 comprises determining, by the network equipment 111, based on the radio unit information, whether first citizens broadband radio service (CBRS) transmissions associated with the radio unit 131 are threshold likely to interfere with second citizens broadband radio service transmissions within a protection area, such transmissions of the incumbent user device 162 within the DPA 160. If the first CBRS transmissions are not threshold likely to interfere with the second CBRS transmissions, then the network equipment 111 can select, or permit the radio unit 131 to select, any available CBRS channel including any channel that could otherwise be flagged as a reclaimable CBRS channel, or any different, non-reclaimable CBRS channel.

Operation 906 comprises, in response to the determining at operation 904 indicating that the first CBRS transmissions are threshold likely to interfere with the second CBRS transmissions within the protection area 160, predicting, by the network equipment 111, a reclaimable CBRS channel associated with the protection area 160, in order to facilitate selection of a different CBRS channel for use by the radio unit 131, wherein the different CBRS channel comprises a CBRS channel other than the reclaimable CBRS channel. The reclaimable CBRS channel can comprise, e.g., a CBRS channel associated with a previous use by a device 162 associated with an incumbent user. Predicting the reclaimable CBRS channel can comprise looking up the protection area 160 in a data store 112 comprising respective protection areas and corresponding respective reclaimable CBRS channels.

Selection of the different CBRS channel for use by the radio unit 131 can be performed by the controller 111, or by another component based on an output from the controller 111 and/or the DPA data store 112. For example, in embodiments described in connection with FIG. 2, an output from the DPA data store 112 can be used by a DP 214 in connection with CBRS channel selection.

Operation 908 comprises generating, by the network equipment 111, an output that identifies, e.g., the protection area 160, the reclaimable CBRS channel, and previous use information associated with a previous use of the reclaimable CBRS channel by a device 162 associated with an incumbent user. The controller 111 and/or the DP can then perform the operations 910 and 912 in order to complete the selection of a CBRS channel for use by the radio unit 131.

Operation 910 comprises interacting, by the network equipment 111 (or optionally be the DP 214) with a spectrum access system 140 in order to determine a group of available CBRS channels. For example, the network equipment 111 or DP 214 can submit a spectrum access request to the SAS 140, and in response to submitting the SAS request, the network equipment 111 or DP 214 can receive CBRS channel identifications. The received CBRS channel identifications identify, e.g., all available CBRS channels including reclaimable CBRS channels identified by the DPA data store 112 and any other/different/non-reclaimable CBRS channels. The network equipment 111 or DP 214 can be configured to select, or can permit the network node 131 to select, a different CBRS channel, different than the reclaimable CBRS channel, from among the CBRS channel identifications returned from the SAS 140.

Operation 912 can optionally be performed as part of CBRS channel selection. Operation 912 comprises prioritizing, by the network equipment 111 or DP 214, the available CBRS channels of the group of CBRS channels (the group identified at operation 910) and eliminating the reclaimable CBRS channel(s) from the group of CBRS channels in order to select the different CBRS channel. Selection of the different CBRS channel for use by the radio unit 131 can comprise prioritizing CBRS channel identifications according channel performance measurements or any other criteria.

Figure 10:
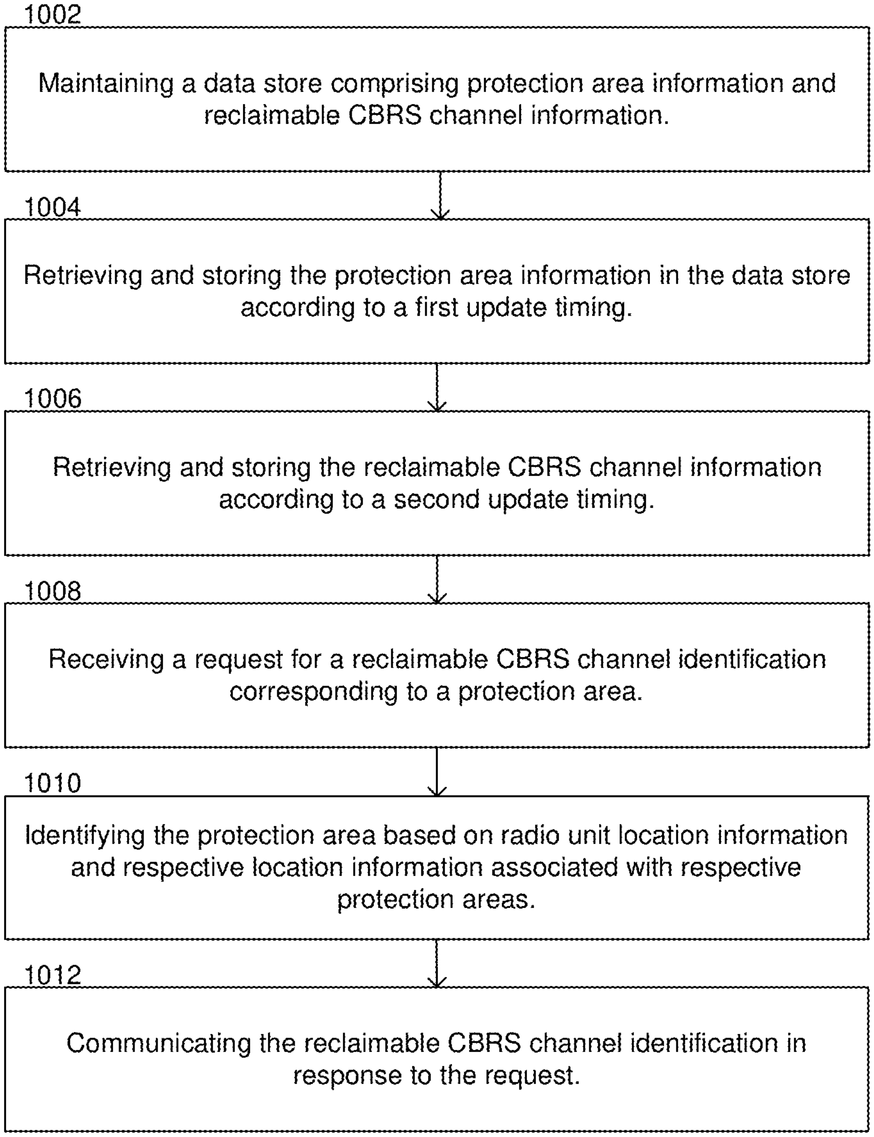
FIG. 10 is a flow diagram of an example, non-limiting computer implemented method to maintain and use a DPA data store for use in CBRS channel selection, in accordance with one or more embodiments described herein.

FIG. 10 is a flow diagram of an example, non-limiting computer implemented method to maintain and use a DPA data store for use in CBRS channel selection, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 10 can be performed by equipment such as the controller 111 and DPA data store 112 illustrated in FIG. 1. The controller 111 can comprise a non-RT RIC of a cellular network, such as the non-RT RIC 212 illustrated in FIG. 2.

Operation 1002 comprises maintaining a data store 112 comprising protection area (DPA) information and reclaimable CBRS channel information. The protection area information can comprise, for example, respective location information associated with respective DPAs, such as the DPA 160. The reclaimable CBRS channel information can comprise respective reclaimable CBRS channel identifications corresponding to the respective DPAs. The respective reclaimable CBRS channel identifications can identify CBRS channels associated with previous use by a device associated with an incumbent user, such as the incumbent user device 162.

In some embodiments maintaining the data store 112 can comprise operations 1004 and 1006. Operation 1004 comprises retrieving and storing the protection area information in the data store 112 according to a first update timing, e.g., via first updates from the DPA location data source 143. Operation 1006 comprises retrieving and storing the reclaimable CBRS channel information according to a second update timing, e.g., via second updates from the DPA incumbent frequency use data source 143.

Operation 1008 comprises receiving a request for a reclaimable CBRS channel identification corresponding to a protection area of the respective protection areas identified in the data store 112. For example, the controller 111 can use a network node 131 location to query the data store 112 for any proximal DPA and corresponding reclaimable CBRS channel identifications.

Operation 1010 comprises identifying the protection area 160 based on radio unit 131 location information and respective location information associated with respective protection areas stored in the data store 112. Operation 1012 comprises communicating the reclaimable CBRS channel identification in response to the request. For example, the data store 112 can identify reclaimable CBRS channel(s) to the controller 111 in response to the controller's 111 request. Alternatively, reclaimable CBRS channel(s) can be communicated to a DP 214 or to a network node 131. Communicating the reclaimable CBRS channel identification in response to the request facilitates avoidance, by a radio unit 131 of the radio access network, of a reclaimable CBRS channel that is identified by the reclaimable CBRS channel identification.

Figure 11:
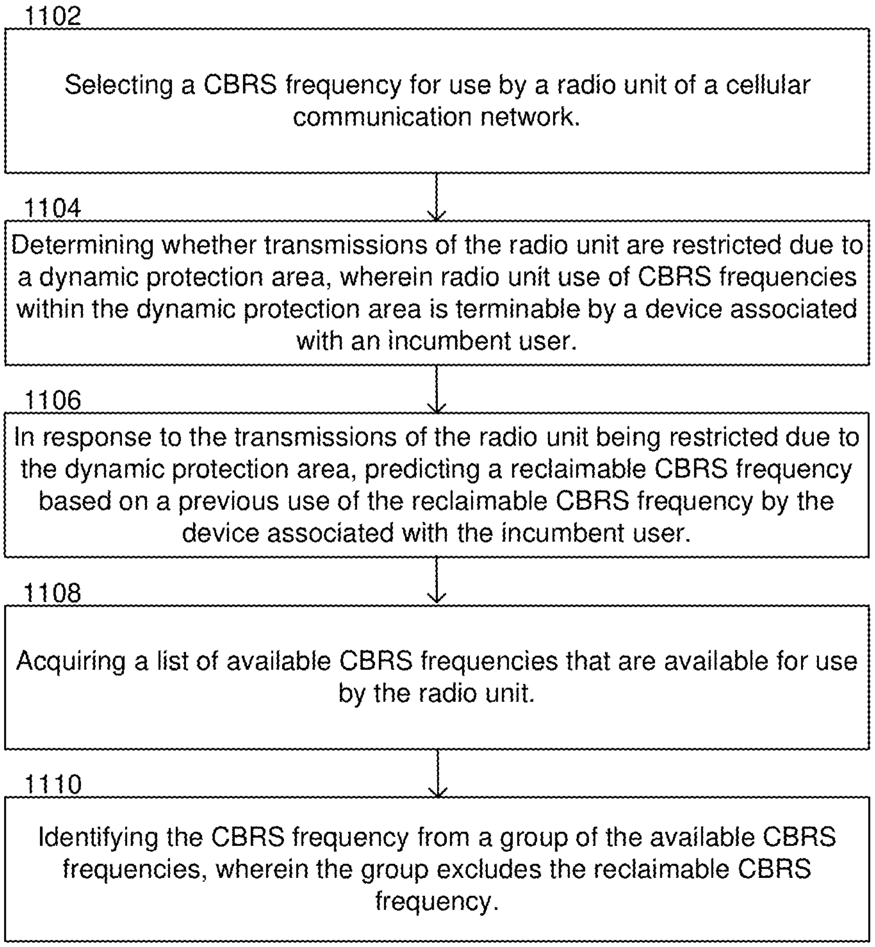
FIG. 11 is a flow diagram of another example, non-limiting computer implemented method to select a CBRS channel for use by a radio unit, in accordance with one or more embodiments described herein.

FIG. 11 is a flow diagram of another example, non-limiting computer implemented method to select a CBRS channel for use by a radio unit, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 11 can be performed by equipment such as the controller 111 and DPA data store 112 illustrated in FIG. 1. Operation 1102 comprises selecting a CBRS frequency for use by a radio unit, e.g., a radio unit 233 of a cellular communication network node 131.

Operation 1104 can be performed in connection with selecting a CBRS frequency pursuant to operation 1102. Operation 1104 comprises determining whether transmissions of the radio unit 233 are restricted due to a dynamic protection area, e.g., the DPA 160, wherein radio unit 233 use of CBRS frequencies within the dynamic protection area 160 is terminable by a device 162 associated with an incumbent user.

The transmissions of the radio unit 233 can be referred to as first transmissions, and determining whether the first transmissions of the radio unit 233 are restricted due to the dynamic protection area 160 can comprise, e.g., comparing a first location of the radio unit 233 to a second location of the dynamic protection area 160 in order to determine whether the first transmissions of the radio unit 233 are threshold likely to interfere, within the dynamic protection area 160, with second transmissions of the device 162 associated with the incumbent user.

Determining whether the first transmissions of the radio unit 233 are restricted due to the dynamic protection area 160 can further comprise determining, based on a transmission power of the first transmissions, whether the first transmissions of the radio unit 233 are threshold likely to interfere, within the dynamic protection area 160, with the second transmissions of the device 162 associated with the incumbent user. It is noted that even though the device 162 may not be active, the controller 111 can nonetheless determine whether the first transmissions of the radio unit 233 are threshold likely to interfere with device 162 transmissions should the device 162 become active.

Operation 1106 comprises, in response to the transmissions of the radio unit 233 being restricted due to the dynamic protection area 160, predicting a reclaimable CBRS frequency based on a previous use of the reclaimable CBRS frequency by the device 162 associated with the incumbent user. Predicting the reclaimable CBRS frequency based on the previous use of the reclaimable CBRS frequency by the device 162 associated with the incumbent user can comprise submitting a request to an updated data store 112 comprising dynamic protection area information (retrieved from the DPA location data source 143) and updated reclaimable CBRS information (retrieved from the DPA incumbent frequency use data source 146). The previous use of the reclaimable CBRS frequency by the device 162 associated with the incumbent user can comprise a variety of usage information, including, e.g., information indicating use duration and whether such duration is within a predetermined duration range.

Operation 1108 comprises acquiring a list of available CBRS frequencies that are available for use by the radio unit 233. Acquiring the list of available CBRS frequencies can comprise submitting a SAS request to the SAS 140, and receiving the list of available CBRS frequencies from the SAS 140.

Operation 1110 comprises identifying the CBRS frequency from a group of the available CBRS frequencies, wherein the group excludes the reclaimable CBRS frequency. Identifying the CBRS frequency from the group of the available CBRS frequencies can comprise, e.g., prioritizing respective available CBRS frequencies within the group of the available CBRS frequencies based on, e.g., respective received signal strength indicator (RSSI) information associated with the respective available CBRS frequencies, and identifying a higher priority CBRS frequency of the group of the available CBRS frequencies as the CBRS frequency, wherein the higher priority CBRS frequency is associated with a higher priority than a lower priority CBRS frequency.

Figure 12:
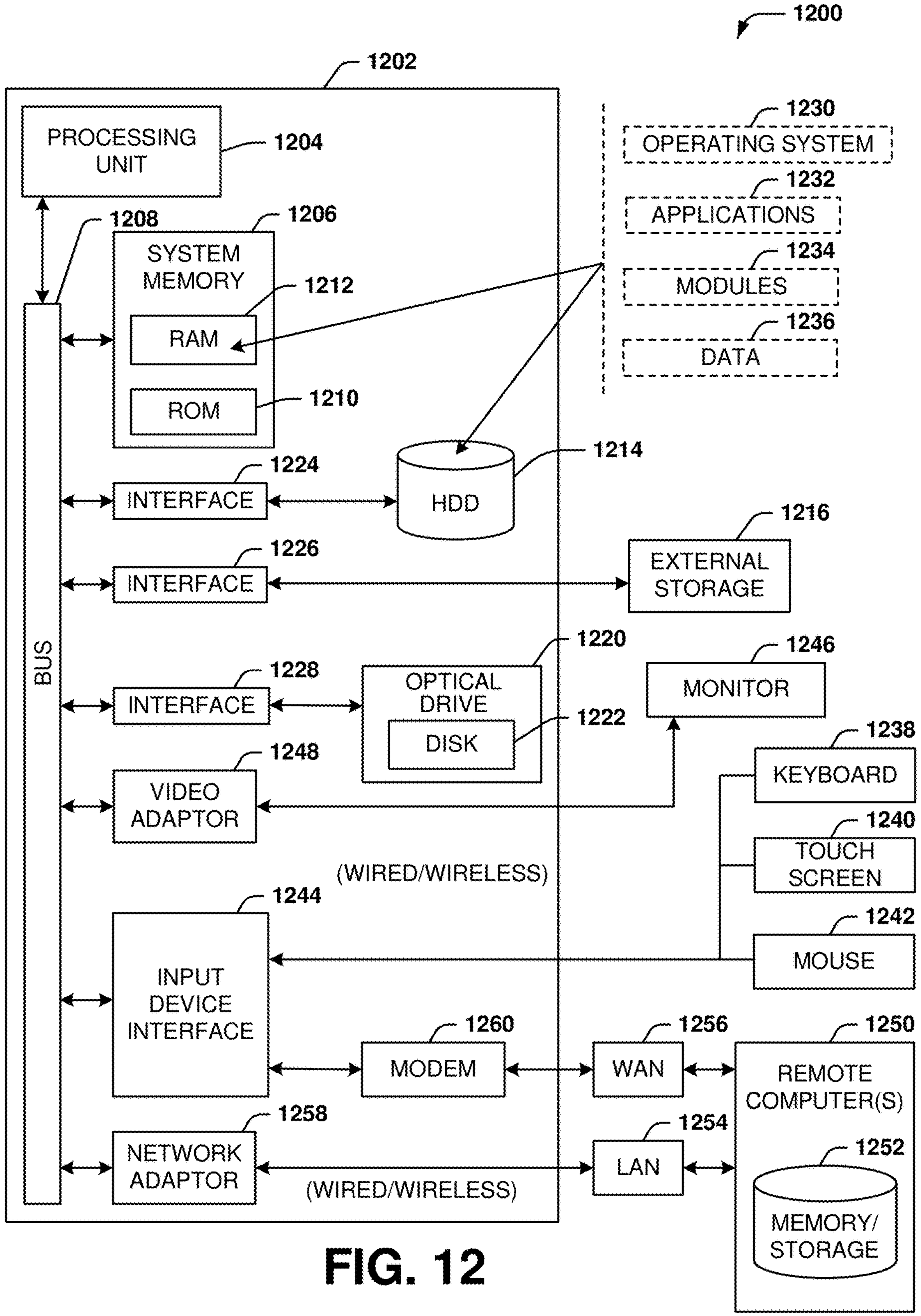
FIG. 12 illustrates a block diagram of an example computer operable to provide any of the various devices described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors and may include a cache memory. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can comprise a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by network equipment comprising a processor, radio unit information associated with a radio unit, wherein the radio unit information comprises radio unit position information representative of a position of the radio unit and radio unit transmission power information representative of a transmission power associated with transmission by the radio unit;

determining, by the network equipment, based on the radio unit information, whether first citizens broadband radio service transmissions associated with the radio unit are threshold likely to interfere with second citizens broadband radio service transmissions within a protection area; and in response to the determining indicating that the first citizens broadband radio service transmissions are threshold likely to interfere with the second citizens broadband radio service transmissions within the protection area, predicting, by the network equipment, a reclaimable citizens broadband radio service channel associated with the protection area to result in a predicted reclaimable citizens broadband radio service channel; and based on the predicted reclaimable citizens broadband radio service channel, selecting a different citizens broadband radio service channel for use by the radio unit, wherein the different citizens broadband radio service channel comprises a citizens broadband radio service channel other than the predicted reclaimable citizens broadband radio service channel.

2. The method of claim 1, wherein the predicted reclaimable citizens broadband radio service channel comprises a citizens broadband radio service channel associated with a previous use by a device associated with an incumbent user.

3. The method of claim 1, further comprising:

in response to the determining indicating that the first citizens broadband radio service transmissions are not threshold likely to interfere with the second citizens broadband radio service transmissions, permitting, by the network equipment, the radio unit to select the predicted reclaimable citizens broadband radio service channel or the different citizens broadband radio service channel.

4. The method of claim 1, wherein the selecting of the different citizens broadband radio service channel comprises generating, by the network equipment, an output that identifies the protection area, the predicted reclaimable citizens broadband radio service channel, and previous use information associated with a previous use of the predicted reclaimable citizens broadband radio service channel by a device associated with an incumbent user.

5. The method of claim 4, wherein receiving the radio unit information comprises receiving the radio unit information via a domain proxy configured to communicate with the radio unit, and wherein selecting of the different citizens broadband radio service channel for use by the radio unit further comprises communicating the output via the domain proxy.

6. The method of claim 1, wherein the selecting of the different citizens broadband radio service channel for use by the radio unit comprises:

in response to submitting a spectrum access system request, receiving citizens broadband radio service channel identifications, wherein the citizens broadband radio service channel identifications identify at least the predicted reclaimable citizens broadband radio service channel and the different citizens broadband radio service channel; and selecting the different citizens broadband radio service channel from among the citizens broadband radio service channel identifications.

7. The method of claim 6, wherein the selecting of the different citizens broadband radio service channel for use by the radio unit further comprises prioritizing the citizens broadband radio service channel identifications.

8. The method of claim 1, wherein the predicting of the predicted reclaimable citizens broadband radio service channel comprises looking up the protection area in a data store comprising respective protection areas and corresponding respective reclaimable citizens broadband radio service channels.

9. A non-transitory machine-readable medium, comprising executable instructions that, when executed by at least one processor, facilitate performance of operations, comprising:

selecting a citizens broadband radio service frequency for use by a radio unit of a cellular communication network, wherein selecting the citizens broadband radio service frequency comprises:

determining whether transmissions of the radio unit are restricted due to a dynamic protection area, wherein radio unit use of citizens broadband radio service frequencies within the dynamic protection area is terminable by a device associated with an incumbent user;

in response to the transmissions of the radio unit being restricted due to the dynamic protection area, predicting a reclaimable citizens broadband radio service frequency based on a previous use of the reclaimable citizens broadband radio service frequency by the device associated with the incumbent user;

acquiring a list of available citizens broadband radio service frequencies that are available for use by the radio unit; and identifying the citizens broadband radio service frequency from a group of the available citizens broadband radio service frequencies, wherein the group excludes the reclaimable citizens broadband radio service frequency; and selecting, from the group, a citizens broadband radio service frequency for use by the radio unit.

10. The non-transitory machine-readable medium of claim 9, wherein the transmissions of the radio unit are first transmissions of the radio unit, and wherein determining whether the first transmissions of the radio unit are restricted due to the dynamic protection area comprises:

comparing a first location of the radio unit to a second location of the dynamic protection area in order to determine whether the first transmissions of the radio unit are threshold likely to interfere, within the dynamic protection area, with second transmissions of the device associated with the incumbent user.

11. The non-transitory machine-readable medium of claim 10, wherein determining whether the first transmissions of the radio unit are restricted due to the dynamic protection area further comprises determining, based on a transmission power of the first transmissions, whether the first transmissions of the radio unit are threshold likely to interfere, within the dynamic protection area, with the second transmissions of the device associated with the incumbent user.

12. The non-transitory machine-readable medium of claim 9, wherein predicting the reclaimable citizens broadband radio service frequency based on the previous use of the reclaimable citizens broadband radio service frequency by the device associated with the incumbent user comprises submitting a request to an updated data store comprising dynamic protection area information and updated reclaimable citizens broadband radio service channel information.

13. The non-transitory machine-readable medium of claim 9, wherein acquiring the list of available citizens broadband radio service frequencies that are available for use by the radio unit comprises submitting a spectrum access system request.

14. The non-transitory machine-readable medium of claim 9, wherein identifying the citizens broadband radio service frequency from the group of the available citizens broadband radio service frequencies comprises:

prioritizing respective available citizens broadband radio service frequencies within the group of the available citizens broadband radio service frequencies based on respective received signal strength indicator information associated with the respective available citizens broadband radio service frequencies; and identifying a higher priority citizens broadband radio service frequency of the group of the available citizens broadband radio service frequencies as the citizens broadband radio service frequency, wherein the higher priority citizens broadband radio service frequency is associated with a higher priority than a lower priority citizens broadband radio service frequency.

15. The non-transitory machine-readable medium of claim 9, wherein the citizens broadband radio service frequencies comprise frequencies within a range from about 3550 megahertz to about 3700 megahertz.

16. The non-transitory machine-readable medium of claim 9, wherein the previous use of the reclaimable citizens broadband radio service frequency by the device associated with the incumbent user comprises a duration within a predetermined duration range.

17. A system, comprising at least one processor configured to process executable instructions that, when executed by the at least one processor, facilitate performance of operations, comprising:

receiving radio unit information associated with at least one radio unit;

based on the radio unit information, determining whether at least one first citizens broadband radio service transmission associated with the at least one radio unit is threshold likely to interfere with at least one second citizens broadband radio service transmission within at least one protection area;

responsive to at least one of the at least one first citizens broadband radio service transmission being determined to be threshold likely to interfere with at least one of the at least one second citizens broadband radio service transmission within the protection area, predicting at least one reclaimable citizens broadband radio service channel associated with the at least one protection area to result in at least one predicted reclaimable citizens broadband radio service channel; and based on the at least one predicted reclaimable citizens broadband radio service channel, selecting at least one citizens broadband radio service channel for use by the at least one radio unit to result in at least one selected citizens broadband radio service channel, wherein the at least one selected citizens broadband radio service channel comprises at least one citizens broadband radio service channel other than the at least one predicted reclaimable citizens broadband radio service channel.

18. The system of claim 17, wherein the radio unit information comprises at least one of: radio unit position information representative of at least one position of the at least one radio unit or radio unit transmission power information representative of at least one transmission power associated with at least one transmission by the at least one radio unit.

19. The system of claim 17, wherein use by the at least one selected citizens broadband radio service channel facilitates avoidance, by the at least one radio unit, of transmission according to the at least one predicted reclaimable citizens broadband radio service channel.

20. The system of claim 17, wherein the operations further comprise:

responsive to determining that the at least one first citizens broadband radio service transmission is not threshold likely to interfere with the at least one second citizens broadband radio service transmission, selecting at least one of the at least one reclaimable citizens broadband radio service channel or at least one citizens broadband radio service channel other than at least one of the at least one reclaimable citizens broadband radio service channel.

* * * * *